(12) United States Patent
Kaku et al.

(10) Patent No.: US 7,495,203 B2
(45) Date of Patent: *Feb. 24, 2009

(54) IN-SITU POWER MONITOR PROVIDING AN EXTENDED RANGE FOR MONITORING INPUT OPTICAL POWER INCIDENT ON AVALANCHE PHOTODIODES

(75) Inventors: Shinkyo Kaku, San Jose, CA (US); Vitali Tikhonov, Mountain View, CA (US)

(73) Assignee: Allied Telesyn, Inc., Bothell, WA (US)

( * ) Notice: Subject to any disclaimer, the term of this patent is extended or adjusted under 35 U.S.C. 154(b) by 498 days.

This patent is subject to a terminal disclaimer.

(21) Appl. No.: 11/223,646

(22) Filed: Sep. 9, 2005

(65) Prior Publication Data

US 2007/0058989 A1 Mar. 15, 2007

(51) Int. Cl.
*H03F 3/08* (2006.01)
(52) U.S. Cl. ............ 250/214 A; 398/202; 250/214 AG; 250/214 C
(58) Field of Classification Search ............ 250/214 A, 250/214 C, 214 AG; 398/202
See application file for complete search history.

(56) References Cited

U.S. PATENT DOCUMENTS

| | | | |
|---|---|---|---|
| 5,838,476 A | 11/1998 | Harasawa et al. | |
| 5,929,982 A | 7/1999 | Anderson | |
| 6,188,059 B1 | 2/2001 | Nishiyama et al. | |
| 6,313,459 B1 | 11/2001 | Hoffe et al. | |
| 6,919,716 B1 | 7/2005 | Buehler | |
| 7,112,777 B2 * | 9/2006 | Griffioen | 250/214 AG |
| 2003/0210917 A1 * | 11/2003 | Stewart et al. | 398/209 |

OTHER PUBLICATIONS

Maxim, 76V, "High-Side, Current-Sense Amplifiers with Voltage Output," *MAX4080/MAX4081*, 19-2562, Rev 0, Oct. 2002, pp. 1-15.
Analog Devices, "Avalanche Photodiode Bias Controller and Wide-Range (5 nA—5 mA) Current Monitor," © *Analog Devices, Inc.*, 2005, pp. 1-11.

* cited by examiner

*Primary Examiner*—Stephen Yam
(74) *Attorney, Agent, or Firm*—Cooley Godward Kronish LLP

(57) ABSTRACT

Disclosed are an in-line monitoring apparatus, an optical receiver and a method for monitoring an input power of an optical signal in which one or more power monitoring stages, for example can measure the input power over an extended input power range. In one embodiment, an apparatus includes an avalanche photodiode ("APD") configured to receive the optical signal and an input configured to bias the APD. It also includes one or more power monitoring stages coupled to the input in parallel with the APD for generating one or more measurement signals in-situ. In one embodiment, a range selector selects which one of the one or more power monitoring stages is to provide a measurement signal indicative of the input optical power. The power monitoring stages can provide for a wide range of linear current measurements as well as a range of measurable currents to monitor low-powered optical signals.

15 Claims, 10 Drawing Sheets

IN-SITU POWER MONITOR PROVIDING AN EXTENDED RANGE FOR MONITORING INPUT OPTICAL POWER INCIDENT ON AVALANCHE PHOTODIODES

BRIEF DESCRIPTION OF THE INVENTION

This invention relates generally to an in-line power monitor, and more particularly, to an in-line power monitor for monitoring input power of an optical signal detector, such as an avalanche photodiode ("APD"). By monitoring the input power in-line, operational parameters of the optical signal detector can be determined and controlled in real-time. For example, the gain of an APD as an operational parameter can be controlled as its temperature varies.

BACKGROUND OF THE INVENTION

Optical receivers facilitate data transfer by detecting optical signals transmitted over optical fiber cables in optical communications networks. In such networks, an optical transmitter modulates optical signals at high frequencies to send them over a fiber using one or more optical wavelengths. To receive the transmitted signals, optical receivers typically use avalanche photodiodes ("APDs") to detect the optical signals. As is known, an APD is a photodiode that has an internally-generated multiplication layer where multiplication of initial photocurrent occurs. The operation of the APD, however, is susceptible to noise and variations in temperature. As such, measuring the photocurrent and adjusting the bias voltage are both necessary to ensure proper APD operation. But conventional structures and techniques for facilitating photocurrent measurements and bias voltage adjustments have several drawbacks.

FIG. 1 is a conventional configuration network 100 for long distance communications. Generally, an optical network includes many transmitters and receivers. For illustration purposes, FIG. 1 shows a multiplexer ("MUX") 106 representing one or more transmitters. Multiplexer operates to combine "n" optical signals 104 of different wavelengths for transmission over an optical fiber 108 as modulated optical signals. A demultiplexed ("DEMUX") 110 representing one or more receivers operating to separate the previously combined signals into optical signals 112. To monitor the operation and quality of optical network, an external power monitor 120 is used to measure the input optical power for any given wavelength of optical signals 112. Typically, external power monitor 120 is used to measure optical power external to a housing that contains an optical receiver device. Drawbacks to this approach to monitoring power are plain. Additional external equipment and resources (e.g., labor, time, etc.) are required to construct this configuration 100 to include external power monitor 120. While configuration 100 can be used to accurately measure power, it is usually used only once, such as during manufacturing of the optical receiver. As such, in-line APD gain adjustments are generally not feasible during normal operations of the APD, especially when it is being used in a communications network. Another drawback to configuration 100 is that external power monitor 120 introduces an additional component causing signal losses in the optical path, thereby degrading optical power monitoring.

FIG. 2A depicts an approach to optical signal power monitoring in which input optical power is monitored internally. In this approach, input optical power, which is derivable from measuring photocurrent, is performed at the output of trans-impedance amplifier ("TIA"). As shown, structure 200 includes an APD 202 to detect optical signals 206, and a trans-impedance amplifier 204 for measuring photocurrent in terms of voltage 208. But there are several drawbacks to this approach to monitoring input optical power. One drawback is that precise signal splitting is technically difficult without disturbing the high-frequency nature of main output signal 208. In particular, elements 231 and 233, which include resistors, R, and capacitors, C, are used to split a portion of main output signal 208 to form a signal portion 209. In this approach, signal portion 209 is used to measure the optical power. But with main output signal 208 commonly being at high frequencies and data transfer rates, such as at 10 Gbps or higher, it is difficult to effectively split the signal for accurate power monitoring. FIG. 2B shows that another drawback to structure 200 in monitoring power is that it has a relatively high-degree of non-linearity, which significantly reduces the total range over which to monitor optical power.

FIG. 2B is a graph 250 depicting the relationship between photocurrent and the output of the trans-impedance amplifier 204 (FIG. 2A). Range 254 is a non-linear range; minute linear changes in photocurrent lead to drastic changes in the trans-impedance amplifier output. It is in this range that trans-impedance amplifier 204 (FIG. 2A) is generally highly saturated. The non-linearity of range 254 reduces the effective range of monitoring power at high input optical power values (e.g., −18 dBm to −3 dBm). As it is desirable to set an alarm limit (e.g., at −3 dBm) to protect an APD from, for example, over-current events, range 254 renders trans-impedance amplifier 204 (FIG. 2A) unusable for detecting unsafe operating conditions.

FIG. 3 depicts another power monitoring approach in which power is monitored internally, and more specifically, prior to the current reaching the trans-impedance amplifier. To internally monitor optical power incident to an APD 320, configuration 300 includes a bias voltage-setting circuit 301, an input stage amplifier 302, a current mirror 304, and a logarithmic amplifier ("log amp") 310. Bias voltage-setting circuit 301 operates to generate a bias voltage at input 311 of input stage amplifier 302, which in turn functions to generate output 313 to bias the input APD voltage at node 303. Unlike the approach described in FIGS. 2A and 2B, trans-impedance amplifier ("TIA") 312 is used only to amplify electrical signals representing the data to be communicated; it is not used for power monitoring purposes. But note that current mirror 304 is included in the current measurement path to logarithmic amplifier ("log amp") 310 for power monitoring purposes. In some alternate structures for configuration 300, current mirror 304 includes a high-voltage transistor ("HV Trans") 306.

In view of the foregoing, it would be desirable to provide an apparatus and a method that minimizes the above-mentioned drawbacks, thereby facilitating power monitoring using an extended range for adjusting gain and controlling unsafe conditions, among other things, especially while operating at different temperatures.

SUMMARY OF THE INVENTION

Disclosed are an in-line monitoring apparatus, an optical receiver and a method for monitoring an input power of an optical signal over an extended range in which one or more power monitoring stages, for example can measure the input power over an extended input power range. In one embodiment, an in-line monitoring apparatus includes an avalanche photodiode ("APD") configured to receive the optical signal and an input configured to provide a bias for the APD. It also includes one or more power monitoring stages coupled to the input in parallel with the APD for generating one or more measurement signals in-situ. The measurement signals are representative of an input optical power. In one embodiment, a range selector selects which one of the one or more power monitoring stages is to provide a measurement signal indicative of the input optical power. Generally, the one or more power monitoring stages have high-impedance inputs for reducing leakage currents. At least one of the power monitoring stages can be configured to provide a range of measurable current to monitor low-powered optical signals with effective immunity to noise at those levels, such as at −45 dBm or lower. The in-line monitoring apparatus obviates the need for external power monitors and series power monitoring devices, such as logarithmic amplifiers and current mirror in series with the APD. The in-line monitoring apparatus also provides for both real-time gain calibration and alarm limit evaluation over the same extended range of input optical power. In some embodiments, the power monitoring stages can provide for a wide range of linear current measurements while also providing a range of measurable currents to monitor low-powered optical signals.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1:
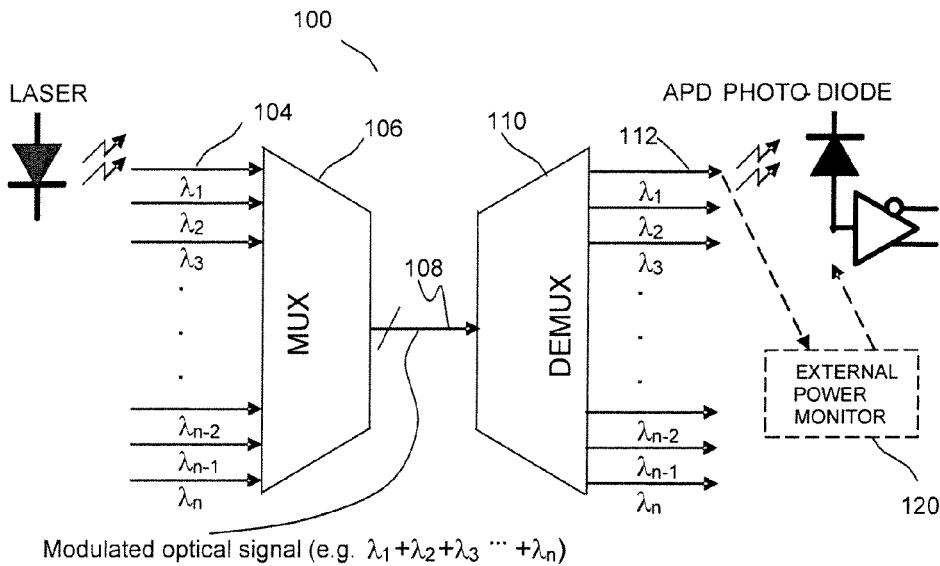
FIG. 1 is a conventional configuration 100 for measuring photocurrents and adjusting bias voltage when monitoring power of an optical signal in an optical network.
Figure 2A:
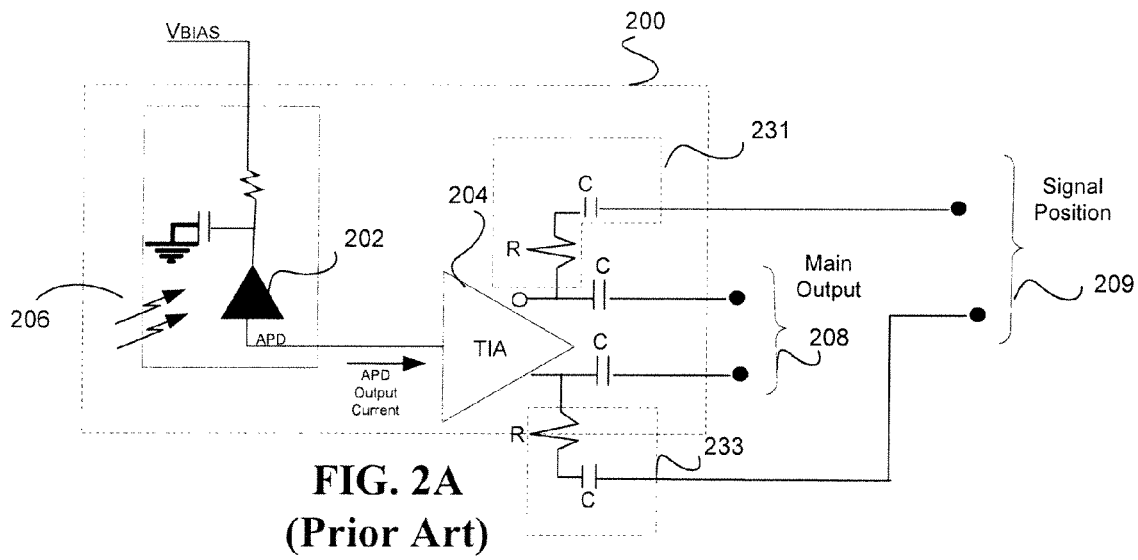
FIGS. 2A and 2B respectively depict a structure and a graph as one conventional approach to power monitoring in which input optical power is monitored internally.
Figure 2B:
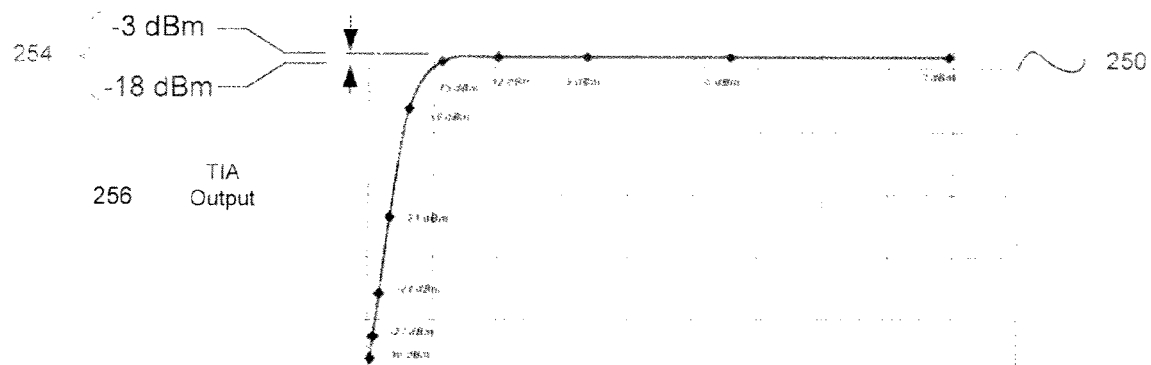
Figure 3:
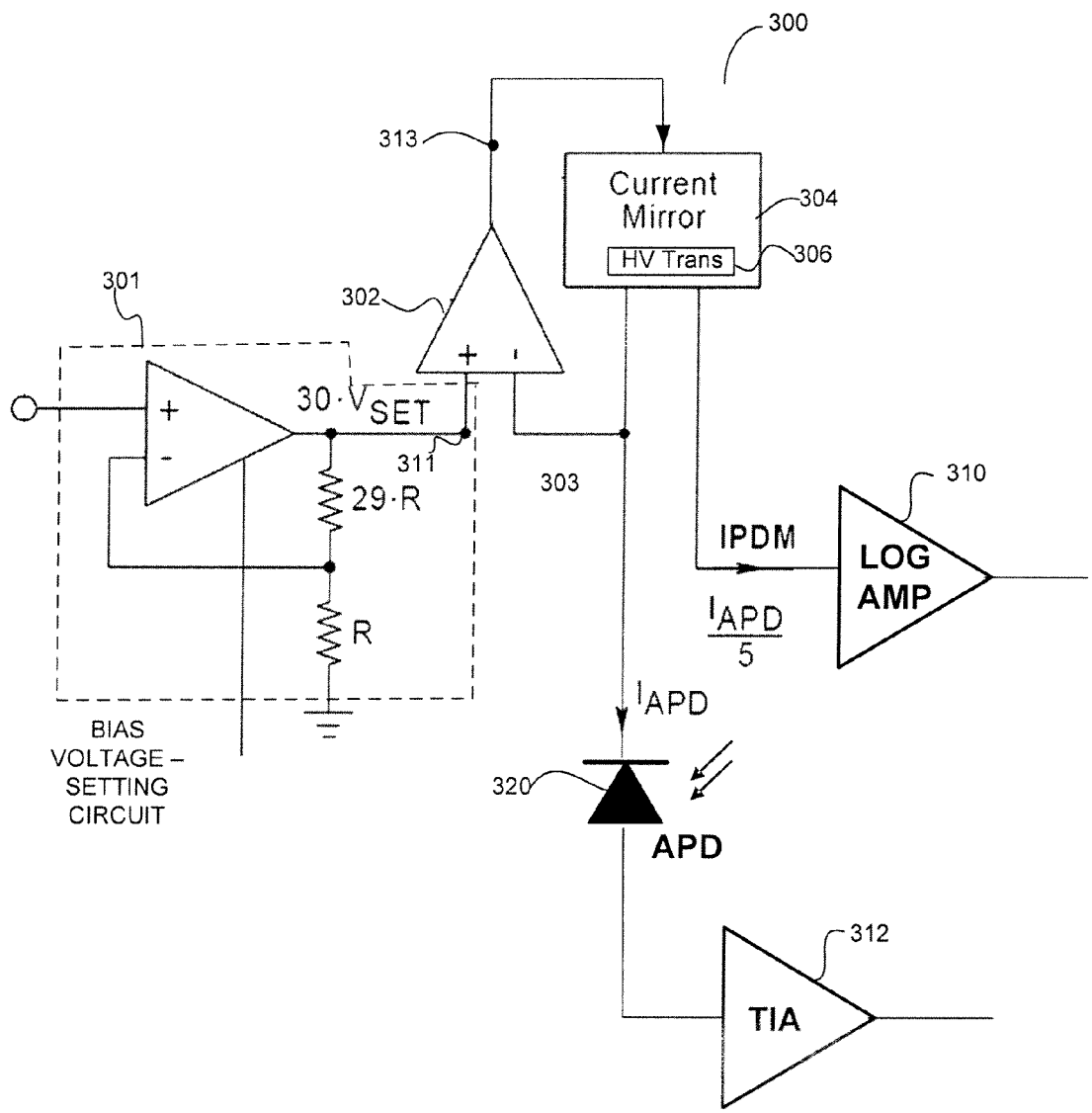
FIG. 3 depicts another conventional power monitoring approach in which power is monitored internally.
Figure 4:
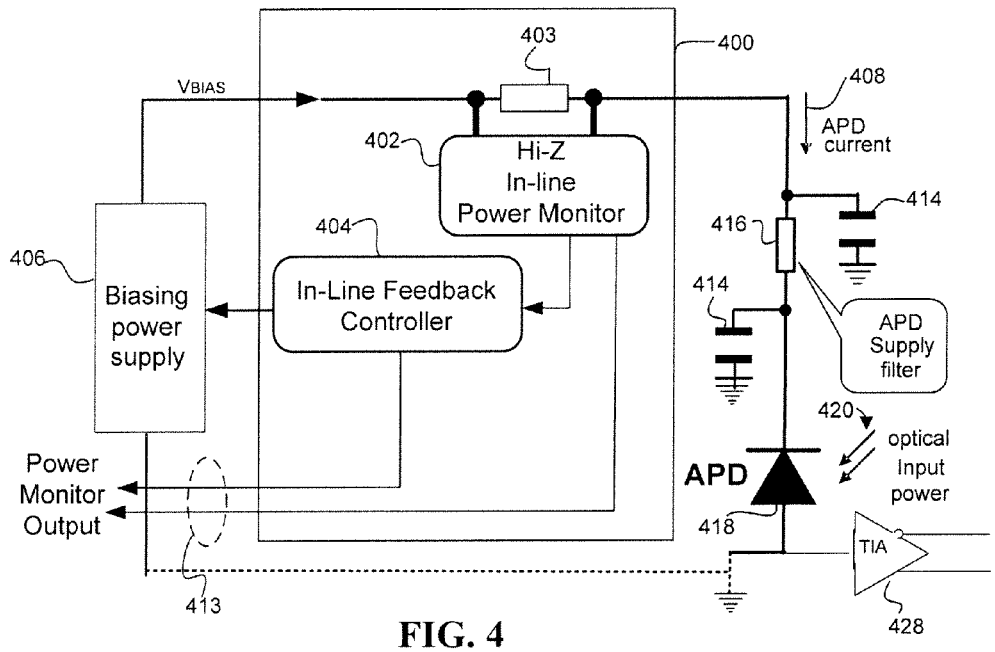
FIG. 4 is a block diagram of an apparatus that monitors input optical power in-line according to at least one specific embodiment of the invention.

FIG. 4 is a block diagram of an apparatus that monitors input optical power in-line, according to at least one specific embodiment of the invention. Apparatus 400 includes an in-line power monitor 402 configured to monitor an optical signal 420 into an optical signal detector by, for example, sensing a current 408 flowing from a biasing source ("biasing power supply") 406, which can provide an adjustable bias voltage. In one embodiment, the optical signal detector is an APD 418. In some cases, a resistance 416 and/or capacitors 414 filter current 408 to reduce, for example, the effects of noise. Apparatus 400 also includes a passive element 403, which can replace 416, to detect and to monitor current 408.

Note that a current 408 through the APD can be described in accordance with Equation (1) as follows:

$$I(\text{APD\_current}) = I_p * \text{APD(responsivity)} * \text{APD(gain)}, \quad \text{Equation (1)}$$

where Ip represents the photon flux into APD 418, APD (responsivity) represents the responsivity of APD 418, and APD(gain) represents the gain (or multiplication) of the APD. Note that the product Ip * APD(responsivity) can be referred to as APD photocurrent, or photocurrent. It should be understood that the term current can refer to either an APD current or a photocurrent photo, or both, as both currents can be indicative of an input optical power. In some embodiments, measuring APD current is synonymous with measuring photocurrent as there is a dependency between the two, as described in Equation (1). By measuring current 408, apparatus 400 can monitor the input optical power incident to APD 418.

Notably, in-line power monitor ("HI-Z In-line power monitor") 402 is a parallel power monitor that monitors input optical power in parallel with APD 418. An in-line power monitor ("HI-Z In-line power monitor") 402 has high-impedance inputs 401a and 401b each limiting leakage currents to relatively small values, especially in applications where the bias voltage of APD 418 can reach up to 76 volts or higher. The current used to monitor power is essentially the same as that flowing through APD 418. In-line power monitor 402 monitors the input optical power by detecting and measuring current 408, rather than regenerating a current that is to be fed, for example, into a logarithmic amplifier, which is common in some traditional internal power monitors. Additionally, in-line power monitor 402 provides an extended range over which it can measure, for example, the input optical power of optical signal 420. As such, the extended range includes an increased range of current values over which in-line power monitor 402 can linearly monitor current 408. Advantageously, this enables in-line power monitor 402 to participate in both gain stabilization and APD safety protection (e.g., in determining whether an input optical power violates an alarm limit). In one embodiment, the extended range has an extended input power range of at least from −45 dBm to −3 dBm. In some embodiments, in-line power monitor 402 can be composed of any number of power monitoring stages, only one of which need be configured to measure relatively low current values (and thus relatively low input optical power levels). The other power monitoring stages each can be used to either provide an extended range for linearly monitoring power or for any other purpose. Advantageously, the use of any number of power monitoring stages can permit wider ranges of current measurements while lowering the lower measurable currents that coincide with low-powered optical input signals, unlike the use of some conventional internal power monitoring techniques.

In-line feedback controller 404 is configured to receive a measurement signal from in-line power monitor 402 and perform a regulatory function to maintain optimum APD operation as an optical signal detector. For example, in-line feedback controller 404 can adjust the bias voltage ("Vbias") of biasing power supply 406. Advantageously, this enables real-time gain control for stabilization purposes, especially over operational temperatures. Namely, in-line feedback controller 404 can minimize the temperature effect on optical power measurements to provide relatively good temperature stability (e.g., about 0.2 dB peak-to-peak variation) during optical power measurements from, for example, −20 to +50 degrees Celsius. As another example, in-line feedback controller 404 can include a safety controller for generating an alarm signal indicating either that optical signal 420 is exposed, or that its power exceeds normal operational limits that can irreparably harm APD 418. An exposed optical signal can harm humans. An exposed optical signal can be detected by a negligible or an absent optical signal. An opening in an optical fiber can expose the optical signal. Also, an input optical power signal that exceeds a certain threshold can damage APD 418. As such, it is desirable in some embodiments to implement an in-line power monitor to detect and prevent input optical power signal levels before they can damage APD 418.

In some embodiments, in-line power monitor 402 can provide a measurement signal 422 to a power monitor output 413, where measurement signal 422 generally represents the input optical power of optical signal 420. Advantageously, power monitor output 413 offers access to in-line (or in-situ) power measurements in real-time, such as when APD 418 is actively participating in optical communications within a network. When an optical receiver and its housing include both apparatus 400 and APD 418, then there is no requirement for an external power monitor or other equipment, such as a channel splitter, to monitor power. In addition, power monitor output 413 requires no efforts to strictly match impedances. In some embodiments, the term in-line is synonymous with in-situ and can be used to describe the power monitor being in an original position and not having been moved to effectuate input optical power measurements.

Figure 5A:
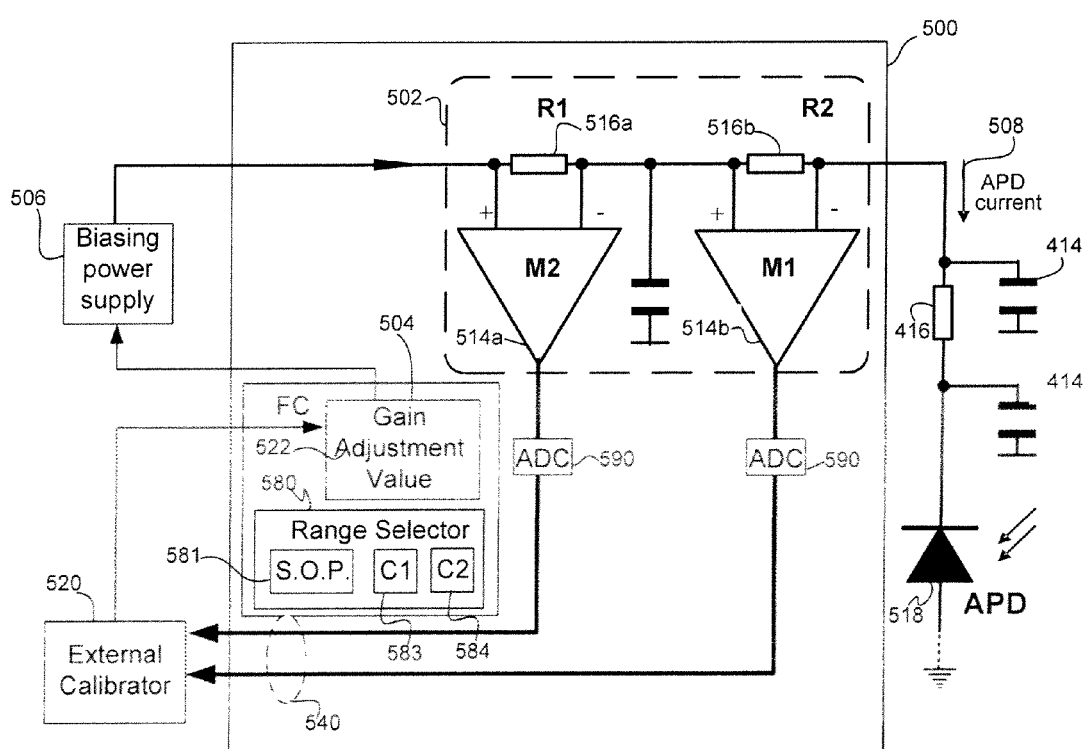
FIG. 5A is a block diagram of an apparatus that includes at least two power monitoring stages for monitoring input optical power, according to at least one specific embodiment of the invention.

FIG. 5A is a block diagram of an apparatus 500 that includes at least two power monitoring stages for monitoring input optical power, according to at least one specific embodiment of the invention. As shown, in-line power monitor 502 includes two power monitoring stages—stage 2 ("M2") 514a and stage 1 ("M1") 514b, both of which include current-sensing amplifiers configured to each sense an APD current 408 flowing through passive elements 516a and 516b. In at least one embodiment, passive elements 516a and 516b are resistors having either the same or different resistances. To establish an extended range according to the various embodiments of the invention, power monitoring stages 514a and 514b are configured to sense a first range and a second range, respectively, of input optical power values. Advantageously, implementing two or more power monitoring stages 514 establish an extended input power range over which linear changes in photocurrent can cause linear changes in bias voltage measurements over the extended range, while providing for detecting and monitoring of low-powered optical input signals unlike various traditional internal APD power monitoring techniques. For instance, power monitoring stage 514a can be configured to detect and monitor low-powered optical input signals, whereas power monitoring stage 514b can be configured to provide a linear range of operation. As is explained later, feedback controller ("FC") 504 is configured to select one of power monitoring stages 514a and 514b to provide a current measurement as a function of the bias voltage, in whole or in part. Apparatus 500 optionally includes analog-to-digital converters ("ADC") 590.

Figure 5B:
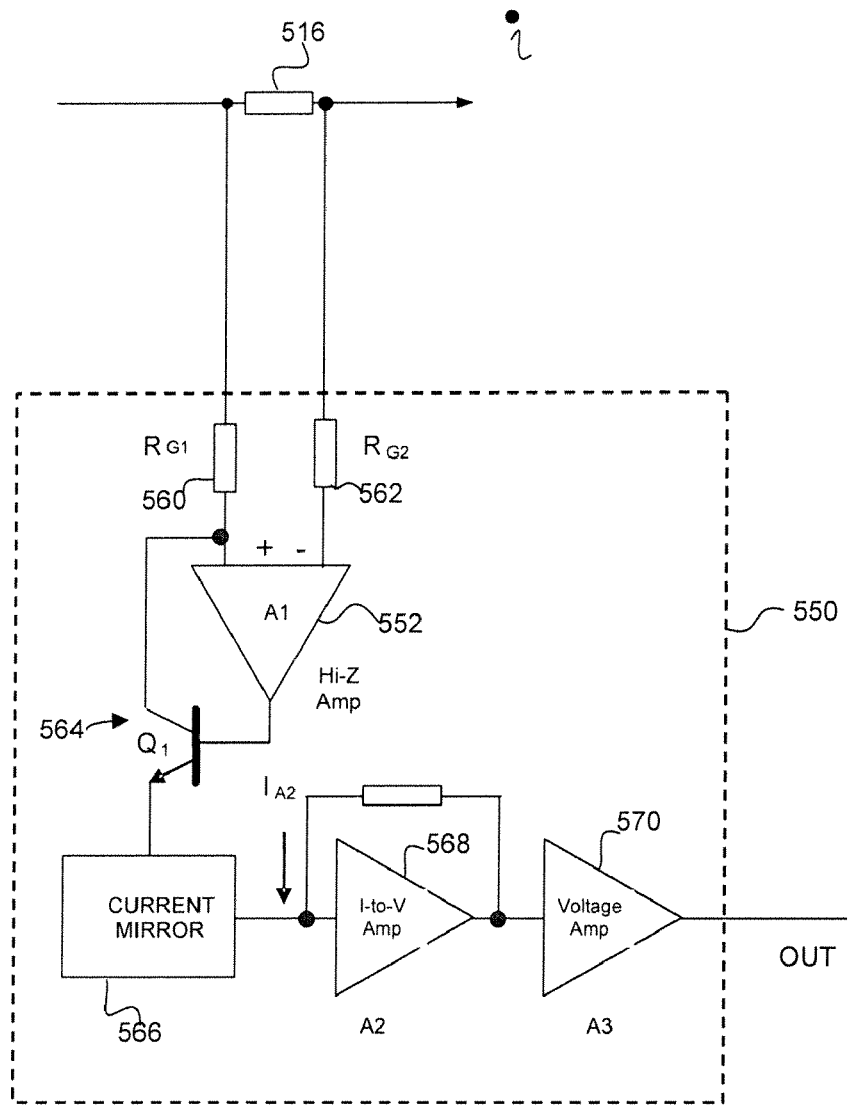
FIG. 5B is a block diagram depicting an example of a power monitoring stage of FIG. 5A, according to at least one specific embodiment of the invention.

FIG. 5B is a block diagram depicting an example of a power monitor stage of FIG. 5A, according to at least one specific embodiment of the invention. Power monitoring stage 550 is configured to detect and monitor a current, such as an APD current (e.g., as described by Equation (1)), passing through passive element 516, which can be a resistor. Power monitoring stage 550 does this by sensing a voltage developing across passive element 516. As shown, power monitoring stage 550 includes a high-impedance amplifier ("Hi-Z Amp") 552 that provides noise immunity at low current and input optical power levels. At its inputs, high-impedance amplifier ("Hi-Z Amp") 552 includes input resistors ("RG1") 560 and ("RG2") 562. One having ordinary skill in the art should appreciate how to determine values for input resistors 560 and 562 for setting the operational range for power monitoring stage 550. In some embodiments, power monitoring stage 550 is configured to receive voltages up through 76 volts. Power monitoring stage 550 optionally includes parallel transistor ("Q1") 564 and a parallel current mirror 566, both of which are in parallel to the photocurrent contributing to the generation of data signals unlike some conventional power monitoring techniques that implement current mirrors in series with the currents used to generate data signals. Further, power monitoring stage 550 can also include current-to-voltage amplifier ("I-to-V amp") 568 and voltage amplifier ("voltage amp") 570 to finally generate electrical signals representing data. Advantageously, the inputs to high-impedance amplifier 552 have high impedances, and therefore, consume relatively small amounts of current. This is especially true at the high voltages required to bias an APD. Consequently, all (or nearly all) of the load current that flows through the monitoring circuit (e.g., at passive element 516) will flow to the APD for purposes of generating data signals. This is unlike some conventional in-line power monitoring circuits that use only a portion of the APD current to monitor power, thereby possibly forfeiting a finer granularity with which to precisely measure current.

In one specific embodiment, in-line power monitor 502 includes only one power monitoring stage, such as power monitoring stage 514a. In this case, power monitoring stage 514a is configured to operate as a low noise, high impedance amplifier to sufficiently reduce the measurable magnitudes of current to a low measured limit. Power monitoring stage 514a can provide a range of, for example, from 25 dB to 30 dB (e.g., from −30 dBm to 0 dBm). As an example, consider that a resistor value of 390 ohms can reduce the effect of noise, such as the noise generated by an amplifier, to provide a lower measured limit (i.e., the lowest measurable current) of about 0.1 microamperes or less. Consequently, power monitoring stage 514a can detect low-powered optical signals that generate APD current levels down to a lower limit of 0.1 microamperes, or less, without being affected detrimentally by noise. A suitable device for implementing each of power monitoring stages 514a and 514b is the MAX4080S current-sense amplifier manufactured by Maxim Integrated Products, Inc. of Sunnyvale, Calif., with voltage gain equal 60, for example.

In another embodiment, in-line power monitor 502 includes two or more power monitoring stages, such as power monitoring stages 514a and 514b, with different resistance values for passive elements 516a and 516b. In this case, at least one of the power monitoring stages is configured to detect and monitor low-powered optical signals. Note that in various embodiments, the power monitoring stage selected to provide low measurable currents could be configured to also provide a linear range of operation, although this is not a requirement. The other one or more power monitoring stages can be configured to provide a wider linear range of measuring optical power.

To illustrate, consider that power monitoring stage 514a is configured to detect and monitor APD currents (and photocurrents) at relatively lower measurable current limits. As such, a resistor value of 390 ohms for passive element 516a is suitable to measure optical power at lower limits, regardless of whether power monitoring stage 514a provides a linear range of current measurement values. Also, consider that 390 ohms sets a lower limit for measuring current by power monitoring stage 514a to about 0.1 microamperes or less. Next, consider that power monitoring stage 514b is configured to provide one or more linear ranges of operation. In this case, passive element 516b is selected to have a relatively smaller resistor value for obtaining higher limits of current measurements. For example, consider that passive element 516b has a resistor value of 50 ohms, which sets an exemplary upper limit of current measurements to about 2000 microamperes or more in this embodiment. So if passive elements 516a and 516b have resistance values of 390 and 50 ohms, respectively, then the combined operation of power monitoring stages 514a and 514b can provide a total measurable range of input optical power from −46 dBm to −3 dBm. This range corresponds to APD current values (i.e., I(APD_current) in Equation (1)) from about 0.1 to about 2000 microamperes.

Figure 6:
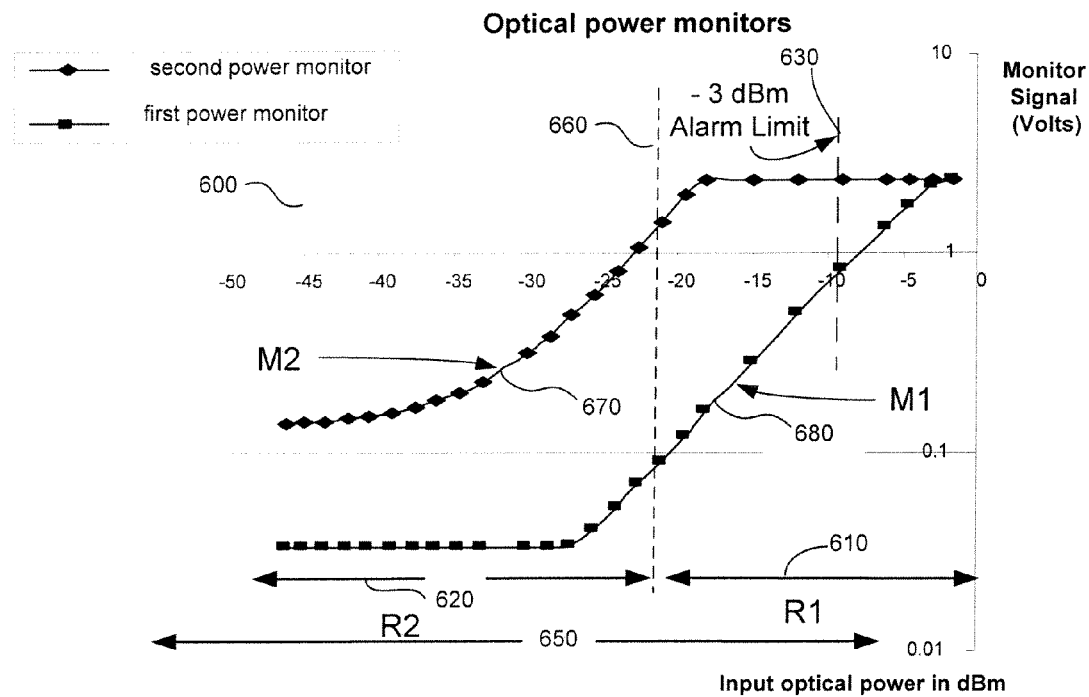
FIG. 6 illustrates the contributions of each power monitoring stage of FIG. 5A for monitoring input optical power, according to an embodiment of the invention.

FIG. 6 illustrates the contributions of each amplifier of FIG. 5A for monitoring input optical power, according to an embodiment of the invention. Graph 600 depicts the relationships of the input optical power measured by each power monitor to one or more output signals generated by in-line power monitor 502. For example, a first power monitoring stage can be configured to provide a range ("R2") 620 over which to measure a first subset of input optical power values (e.g., from about −45 dBm to about −22 dBm). In some embodiments, range 620 can be linear or substantially linear. A second power monitoring stage can be configured to provide a linear (or substantially linear) range ("R1") 610 over which to measure a second subset of input optical power values (e.g., from about −22 dBm to about −1 dBm). The combined ranges 610 and 620 therefore constitute an example of an extended range, with an overlap of about 10 dB shared by ranges 610 and 620. Further to this example, extended range 650 can be broken down into two or more linear range portions, including a first linear range portion and a second linear range portion. Or, extended range 650 can be broken down into a non-linear range portion for measuring low-powered input optical power and one or more linear range portions to establish a relatively wide range of current measurement values to monitor power.

An in-line power monitor can measure the APD current using the first range portion, which in some cases contains a subset of values for calibrating or stabilizing a gain. For example, the first range portion can lie across range 620 and/or a part of range 610 (or more). The in-line power monitor can also measure the APD current using the second range portion, which contains another subset of values for detecting violation of a safety alarm level 630. In this example, the second range portion lies within range 610 and includes safety alarm level 630, which is −3 dBm.

In various embodiments, feedback controller 502 (FIG. 5A) further includes memory and/or-data structures for storing a switch-over point 660. Apparatus 500 (FIG. 5A) switches at switch-over point 660 between input optical power levels in ranges ("R1") 610 and ("R2") 620 to ensure proper power monitoring indicative of using respective curves ("M1") 680 and ("M2") 670. Referring back to FIG. 5A, note that feedback controller 502 can include a range selector 580 for select either range 610 or range 620. Range selector 580 includes a memory for storing data representing switch-over point 660 as switch-over point data ("S.O.P.") 581. The memory can also store a first relationship between measurement signal voltages and monitored input optical power levels as respective curves ("C1") 583, which can be equivalent to curve ("M1") 680 in FIG. 6, for a first power monitoring stage. It also can store a second relationship as ("C2") 584 for a first power monitoring stage. Range selector 580 can operate by first starting out in range 620 using curve ("M2") 670 at the start-up of apparatus 500 and/or prior to application of optical light onto APD 581 (e.g., input optical power of −45 dBm or less). Then, range selector 580 continues to use curve 670 until the measurement signal from power monitoring stage 514a moves across switch-over point 660. After that, range selector uses power monitoring stage 514b to monitor power using curve ("M1") 680. So if range selector 580 starts in a known state (i.e., using a certain power monitoring stage when there is a known level of optical applied to the APD), then it can operate properly as it crosses switch-over point 660. Advantageously, feedback controller 502 and its memory can store non-linear relationships between input optical power levels and a measurement signal 540 (FIG. 5A), which is shown as "monitor signal" in FIG. 6. For example, consider that range 620 includes a relatively non-linear region between −45 and about −32 dBm as well as a relatively linear region from −32 to about −22 dBm, which coincides with switch-over point 660. Again, range 602 can be either completely linear in nature or completely non-linear in nature, or a combination thereof. In addition, feedback controller 502 can store unique relationships depicted as curves ("M1") 680 and ("M2") 670 for each type of APD and/or APD vendor.

Referring back to FIG. 5A, apparatus 500 is configured to use in-line power monitor 502 to facilitate gain calibration for APD 518. Here, in-line feedback controller ("FC") 504 includes a local data store for storing a bias offset, or gain adjustment value 522. The bias offset is configured to offset the bias voltage ("Vbias") generated by a biasing source ("APD power supply") 506. In operation, an external calibrator 520 can be used to receive a measurement signal 540 from either amplifier 514a or 514b. Then, external calibrator 520 can determine a measured value for a current, which corresponds to an input optical power, prior to generating a gain adjustment value 522. This includes selecting the particular power monitoring stage that will provide the measurement signal. External calibrator 520 and in-line feedback controller 504 cooperate to store gain adjustment value 522 in the data store. So when apparatus 500 is removed from external calibrator 520 and disposed in a network, in-line feedback controller 504 can either add or subtract this value from the bias voltage generated by biasing source 506, thereby setting the gain to a predetermined value in-situ. The predetermined value is generally a target gain value that provides for optimal operation of APD 518. In some embodiments, gain adjustment value 522 is stored an external data store either in external calibrator 520 or elsewhere (not shown). In some embodiments, the one or more measurement signals are voltages having values indicative of incident optical power on APD 518.

Figure 7:
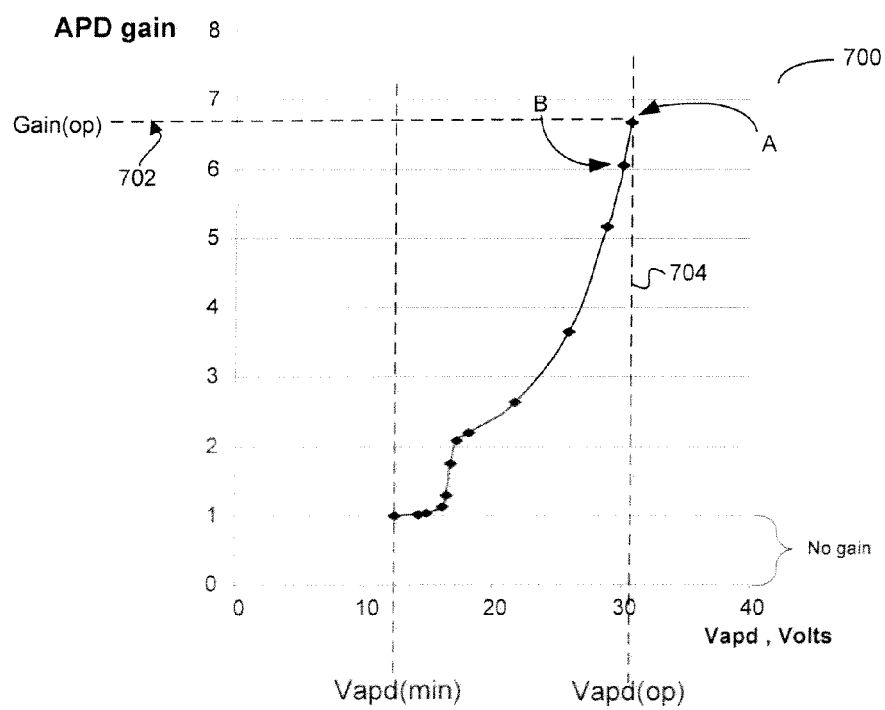
FIG. 7 is a graph showing the relationship between a bias and an APD gain for calibrating the gain, according to an embodiment of the invention.

FIG. 7 is a graph showing the relationship between a bias and an APD gain that can be used for calibrating the APD gain, according to an embodiment of the invention. As shown, when the bias is set at a minimum bias voltage "Vapd(min)," the gain is unitary for the APD. But when the bias is set at the optimal bias voltage 704, "Vapd(op)," then the gain is operating at a target gain value ("gain(op)") 702. During operation, if the gain is at point B when an APD is receiving optical signals, then in some embodiments, in-line feedback controller 504 can be configured to adjust the gain back to point A. To do this, in-line feedback controller 504 can include the functionality of external calibrator 520 for performing in-situ APD gain calibration. Note that resistances 516 can replace resistance 414. Advantageously, this enables each of resistances 516 to serve a dual role—filtering and current sensing, thereby foregoing separate resistances for individually filtering and current-sensing. This helps minimize electrical components necessary to implement an optical receiver according to various embodiments of the invention.

Figure 8:
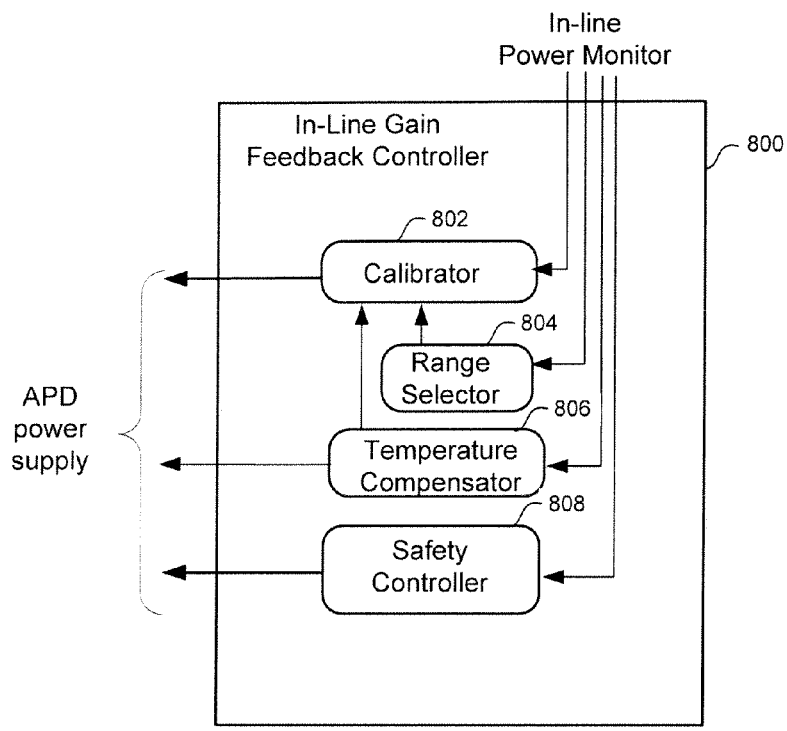
FIG. 8 is a block diagram illustrating an example of an in-line feedback controller for controlling operation of an APD in response to in-line power monitoring measurements, according to at least one embodiment of the invention.

FIG. 8 is a block diagram illustrating an example of an in-line feedback controller for controlling operation of an APD in response to in-line power monitoring measurements, according to at least one embodiment of the invention. In-line feedback controller 800 includes an on-board calibrator ("calibrator") 802, a range selector 804, a temperature compensator 806 and a safety controller 808. Calibrator 802 operates to calibrate the gain of an APD by, for example, adjusting a bias voltage for that APD. Range selector 804 is configured to determine and to select the range in the extended range that is to be used to monitor input optical power. For example, consider that a first range and a second range include respective input optical power values from about −45 dBm to about −22 dBm and from about −22 dBm to about −1 dBm. Next, consider that range selector 804 determines that an in-line power monitor is measuring a photocurrent associated with an input optical power of about −25 dBm. Then range selector 804 will select the first range with which to measure photocurrent and will provide the measured photocurrent value to, for example, calibrator 802 for proper calibration of the APD gain.

Temperature compensator 806 is configured to compensate operational parameters, such as gain, for the effects of temperature on an APD and its environs. In some embodiments, temperature compensator 806 instructs calibrator 802 to adjust bias voltage to compensate for temperature, whereas in other embodiments temperature compensator 806 includes calibration logic to directly interface with an APD power supply to adjust the bias voltage. In-line feedback controller 800 can also include a safety controller 808 for ensuring safe operation of an optical receiver in which an APD operates. For example, if an input optical power signal falls below a certain threshold for some interval of time, then a fiber optic cable may be open, thereby exposing harmful light to persons. So safety controller 808 can initiate shut-down for the optical transmitter associated with the open. But safety controller 808 can also be configured to protect the APD from hazardous conditions, such as an over-current event that might cause damage to the APD. In this case, an alarm limit, such as −3 dBm, is set to shut down the APD power supply should the input optical power signal surpass the alarm limit. In various embodiments of the invention, in-line feedback controller 800 can implement any combination of the elements shown in FIG. 8, thereby adding, omitting or replacing any one of those elements.

Figure 9:
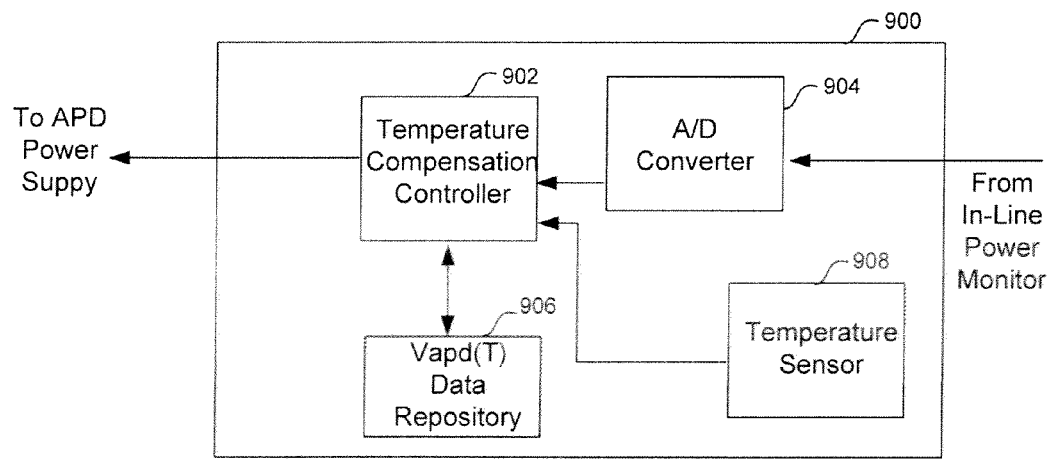
FIG. 9 is a diagram of a temperature compensator in accordance with one embodiment of the invention.

FIG. 9 is a diagram of a temperature compensator in accordance with one embodiment of the invention. Temperature compensator 900 includes a temperature compensation controller 902, an analog-to-digital ("A/D") converter 904, a data repository 906 and a temperature sensor 908. Generally, temperature compensation controller 902 orchestrates gain stabilization for an APD-based optical signal detector by, for example, adjusting the APD bias to maintain a substantially uniform gain as a target gain over temperature. Advantageously, a substantially stable gain over temperature provides an increased sensitivity with which to monitor input optical power, especially at lower levels. Without temperature compensation controller 902, the sensitivity of an optical receiver would be less if the gain was not uncompensated for fluctuations in temperature.

Temperature compensation controller 902 is configured to adjust an operational parameter, such as an APD bias voltage, by an amount that is determined as a function of temperature and a measurement signal representing, for example, photocurrent. In operation, temperature compensation controller 902 receives a photocurrent measurement and a temperature value. In some embodiments, analog-to-digital converter 904 digitizes an analog voltage value representing the measured photocurrent, especially in cases where the in-line power monitor is composed of a number of current-to-voltage amplifiers. In at least one embodiment, a known type of thermistor implements temperature sensor 908, whereby the thermistor generates a signal representative of the measured temperature. Next, temperature compensation controller 902 measures the bias voltage (i.e., the pre-adjusted bias voltage). In some embodiments, temperature compensation controller 902 measures the bias voltage directly at the APD power supply. In other embodiments, temperature compensation controller 902 can calculate the measured bias voltage as a function of a photocurrent measurement provided by analog-to-digital converter 904. To maintain a uniform gain over temperature, temperature compensation controller 902 determines a target bias voltage for stabilizing the APD gain at a target gain for the measured temperature. Data repository 906 generally includes the relationship between various target bias voltages (for a specific target gain) and various temperature values. These relationships can be in a form of a "look-up table." In at least one embodiment, optimal relationships between APD bias voltages and temperature can be determined by optimizing APD sensitivity levels or the optical channel Bit Error Rate ("BER") over the specific temperature range. Then, temperature compensation controller 902 calculates a difference between the measured bias voltage and the target bias voltage to form an adjustment amount for modifying the bias voltage to align it with the target bias voltage. Note that temperature compensation controller 902 can adjust bias voltage directly, or it can instruct calibrator 802 to do so. Regardless, temperature compensation controller 902 maintains proper adjustment of the APD bias voltage to deliver a target APD gain for a particular temperature.

Figure 10:
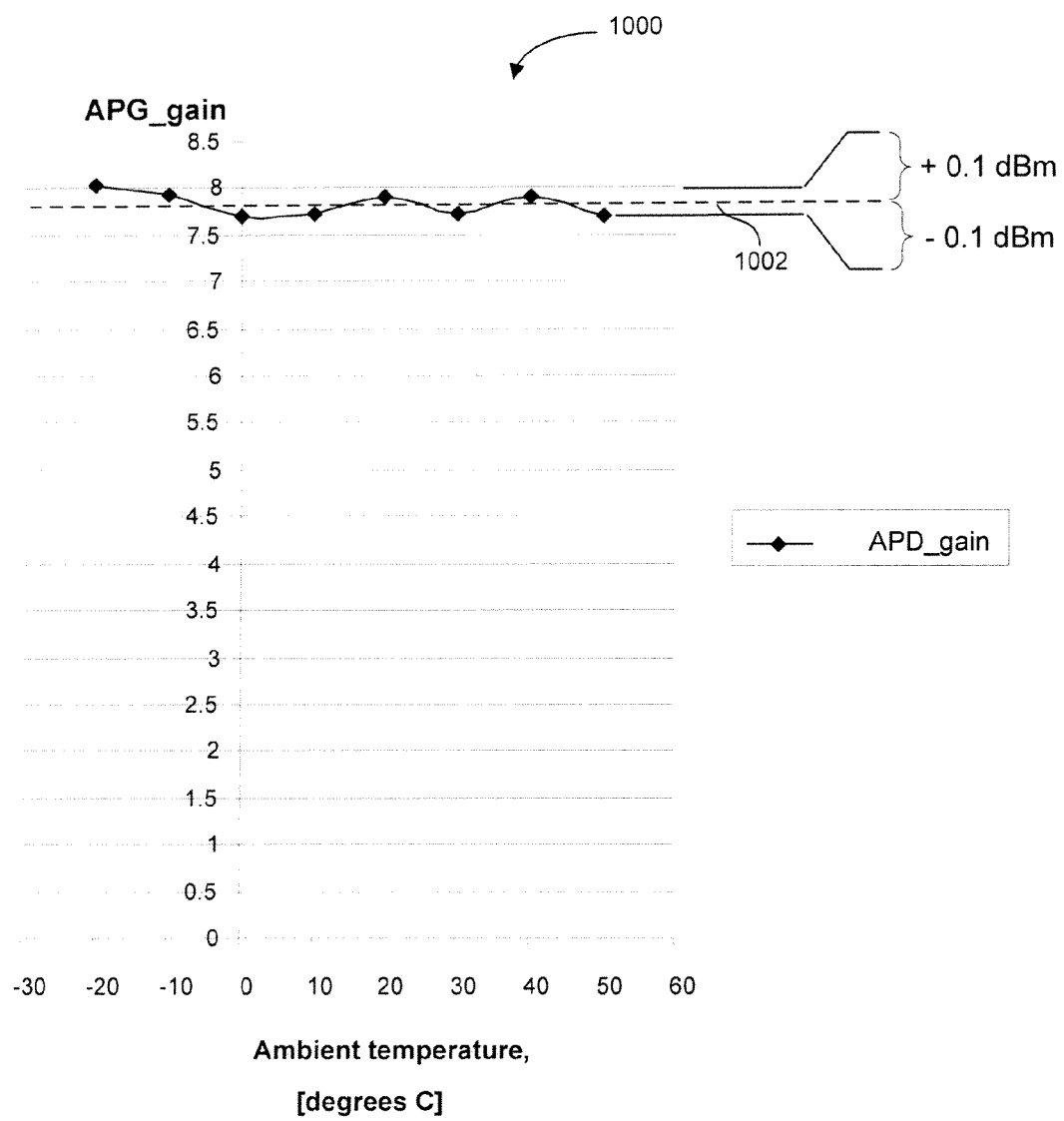
FIG. 10 is a graph depicting the accuracy with which a temperature compensator stabilizes gain over temperature in relation to a target gain, according to one embodiment of the invention.

FIG. 10 is a graph depicting the accuracy with which a temperature compensator stabilizes gain over temperature in relation to a target gain, according to one embodiment of the invention. In particular, a temperature compensator can be configured to apply relationships between target bias voltages and temperature to ensure an accuracy of approximately +/−0.1 dB about target gain 1002, which is about 7.8 in this example. This degree of accuracy can provide optimal device sensitivity in many ranges of operational temperatures. As such, temperature compensators of the various embodiments of the invention can stabilize the operations of the APD with relative ease because the relationships among bias voltages, temperature and target gain values are determinable with a relatively high degree of accuracy, unlike traditionally-formed relationships. In particular, traditional expressions between bias voltage and temperature have been expressed as rigid temperature coefficient curves in terms of the breakdown voltage of APDs, rather than in terms of a target bias voltage. This is because APD protection (e.g., avoiding the breakdown voltage) has been emphasized more than determining the effects of temperature on optimal levels of gain. A temperature coefficient curve is a relationship between bias voltage and temperature based on a temperature coefficient, which represents the magnitude change in voltage per unit temperature (e.g., delta V over delta T). Further, traditional temperature coefficients and their curves usually describe APD bias voltages for various minimum sensitivity measurements at different temperatures, rather than in terms of optimal gain values. In addition, generating conventional temperature coefficients in this manner requires excessive amounts of time and expensive equipment to implement a bit error ("BER") testing system, for example, to establish minimum levels of sensitivity. Therefore, the conventional techniques of using temperature coefficients to relate temperature and APD bias voltage cannot readily be used to relate temperature to target bias voltages for purposes of stabilizing gain. Note that in some embodiments temperature compensator can ensures an accuracy of approximately +/−0.1 dB over at least a temperature range from −20 to +50 degrees Celsius. This accuracy in monitoring power (e.g., approximately 0.2 dB peak-to-peak) corresponds to an accuracy of an APD gain setting, such as +/−3% from average value 1002. In some instances, the accuracy of an APD gain setting is determined by maintaining a constant APD gain relationship over temperature.

Referring back to FIG. 9, data repository 906 is configured to maintain numerous relationships to adjust operational parameters, according to various embodiments of the invention. In at least one embodiment, data repository 906 provides data representing a relationship between the temperature value and a target voltage value associated with target gain value. For example, consider that temperature compensation controller 902 establishes and/or determines relationships by extrapolating between at least two target voltage values, each of which corresponds to a target gain at different temperatures. In another embodiment, data repository 906 provides data necessary to establish a relationship. For instance, consider that temperature compensation controller 902 establishes relationships by extrapolating a temperature coefficient curve through a single target voltage value corresponding to a specific temperature. In cases where the temperature coefficient is a conventional coefficient curve, temperature compensation controller 902 can be configured to shift the temperature coefficient curve to provide a tolerance so as to prevent an associated APD from operating at or near a breakdown region.

Figure 11:
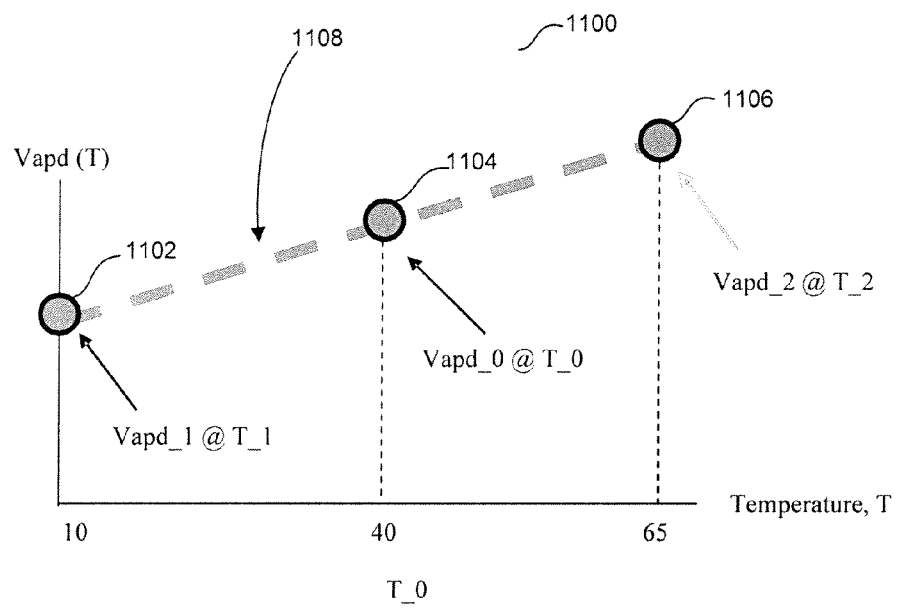
FIG. 11 represents one method of establishing a relationship between temperature and target bias voltage, according to one embodiment of the invention.

FIG. 11 represents one method of establishing a relationship between temperature and target bias voltage, according to one embodiment of the invention. Specifically, graph 1100 depicts a relationship 1108 between temperature and various target bias voltages, Vapd(T). Relationship 1108 can be formed by determining two or more target bias voltages at different temperatures, where each target bias voltage is a bias voltage that provides an optimal gain (i.e., target gain) at the corresponding temperature. In FIG. 11, three points constitute relationship 1108, where points 1102, 1104 and 1106 are target bias voltages at temperatures T1 (e.g., 10 C), T0 (e.g., 40 C), and T2 (e.g., 65 C), respectively. Given relationship 1108, a temperature compensation controller can extrapolate between any two points to determine any target bias voltage. Or, any number of intervening target voltages between points 1102, 1104 and 1106 can be stored, for example, in a look-up table ("LUT") in a data repository for access by a temperature compensation controller. In some embodiments, relationship 1108 can represent an APD temperature coefficient curve, which relates optimal APD bias voltage, or Vapd, for a particular optimal gain value to temperature. By precisely associating optimal APD voltage values (and thus optimal gain values), an APD temperature coefficient curve allows an optical receiver to have the ability to obtain accurate sensitivity levels during operation over temperature.

Figure 12:
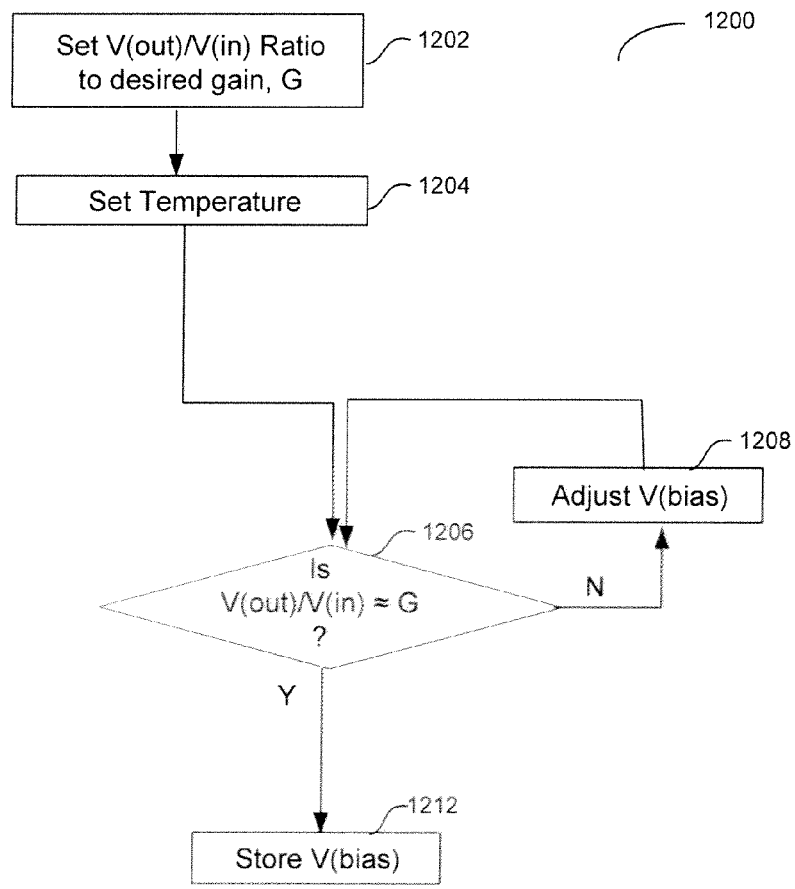
FIG. 12 illustrates an exemplary flow for implementing a method of forming an APD temperature coefficient curve in accordance with an embodiment of the invention.

FIG. 12 illustrates an exemplary flow for implementing a method of forming an APD temperature coefficient curve in accordance with an embodiment of the invention. Generally, flow 1200 generates an APD temperature coefficient curve by adjusting a bias voltage, V(bias), until a target gain value, G, is reached. In this case, V(bias) is V(in). In some embodiments, an in-line power monitor as described herein can be implemented to measure V(bias) during flow 1200. For example, flow 1200 sets the ratio of V(out)/V(in) for comparison against a desired gain value, G, at 1202. At 1204, flow 1200 sets the temperature to a particular temperature value. Flow 1200 then loops through 1206 and 1208 by comparing the ratio V(out)/NV(in) to G (e.g., either an exact or approximate value of G) at 1206, and if the comparison is false, then flow 1200 continues to adjust V(bias) at 1208. Once a particular value of V(bias) is determined to provide a ratio equivalent to G, then that bias voltage is stored at 1212 as a target voltage value for the particular temperature set at 1204. Note that the APD biasing voltage supply can be progressively adjusted from a minimal value to a value corresponding to the target APD gain (or optimal gain). While vendors of APD devices usually specify the APD gain with good accuracy, the vendor-provided gain values are determined statistically on large lots of manufactured devices and can vary between devices. By contrast, flow 1200 enables users of APD devices to more precisely as APD temperature coefficient curves can be used for each unique device.

Figure 13:
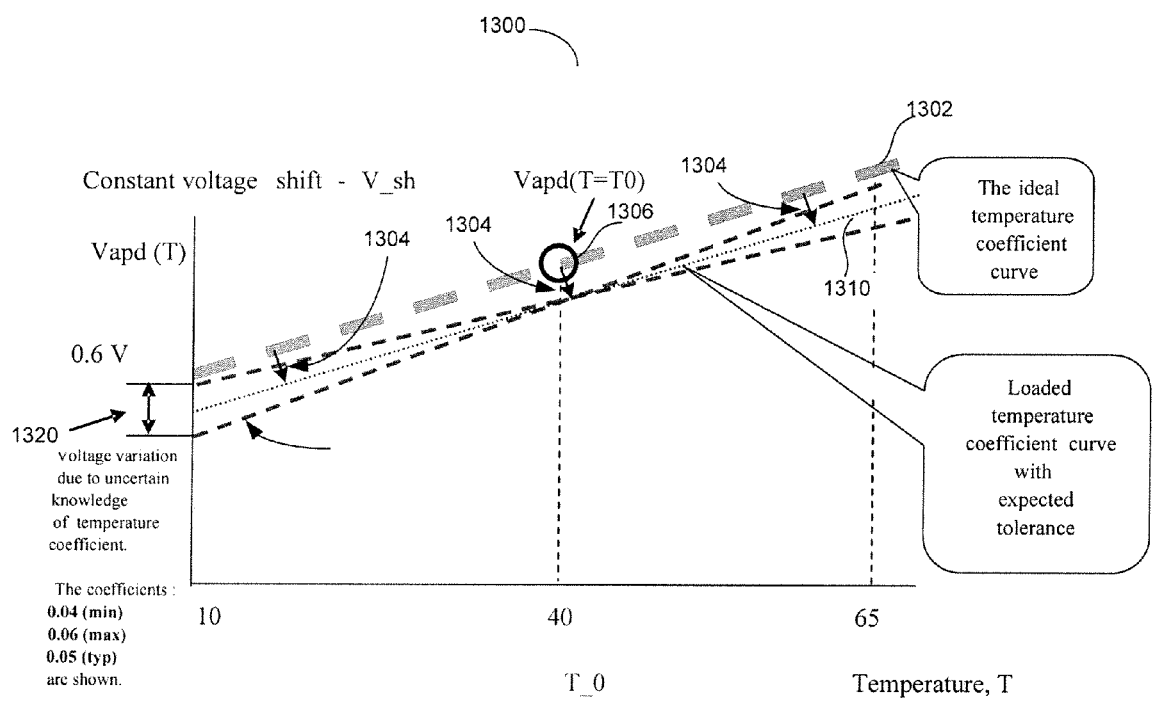
FIG. 13 represents another method of establishing a relationship between temperature and target bias voltage, according to one embodiment of the invention.

FIG. 13 represents another method of establishing a relationship between temperature and target bias voltage, according to one embodiment of the invention. Specifically, graph 1300 depicts a shifted relationship 1310 between temperature and various shifted target bias voltages, Vapd(T). Shifted relationship 1310 can be formed by first determining at least one target bias voltage 1306 at a specific temperature (e.g., at 40 degrees C.), which is a target bias voltage providing an optimal gain (i.e., target gain) at that temperature. Generally, vendors of APD devices provide a single target bias voltage 1306 based on their sensitivity measurements performed at one temperature (e.g., room temperature). Further to this method, shifted relationship 1310 is generated by applying a predetermined temperature coefficient to form a temperature coefficient curve as relationship 1302, which passes through the point represented as the one target bias voltage 1306. The vendors of APDs typically provide temperature coefficients as statistically-determined slopes that represent changes in voltage per unit temperature. An example of a typical temperature coefficient is 0.05. But there is variation in this value. For example, the temperature coefficient can range from a minimum value, such as 0.04, to a maximum value, such as 0.06. A tolerance range 1320 can be set to exclude possible variations in Vapd that give rise to uncertainties due to imprecise temperature coefficients. To avoid these uncertainties, this method forms shifted relationship 1310 by shifting relationship 1302 by an amount ("V_sh") 1304 to establish shifted relationship 1310, which represents a temperature coefficient curve having an expected tolerance. Advantageously, the tolerance of the shifted relationship 1310 provides a safety feature that prevents an APD from entering breakdown while using target bias voltages on shifted relationship 1310 to stabilize gain at optimal values over temperature.

Figure 14:
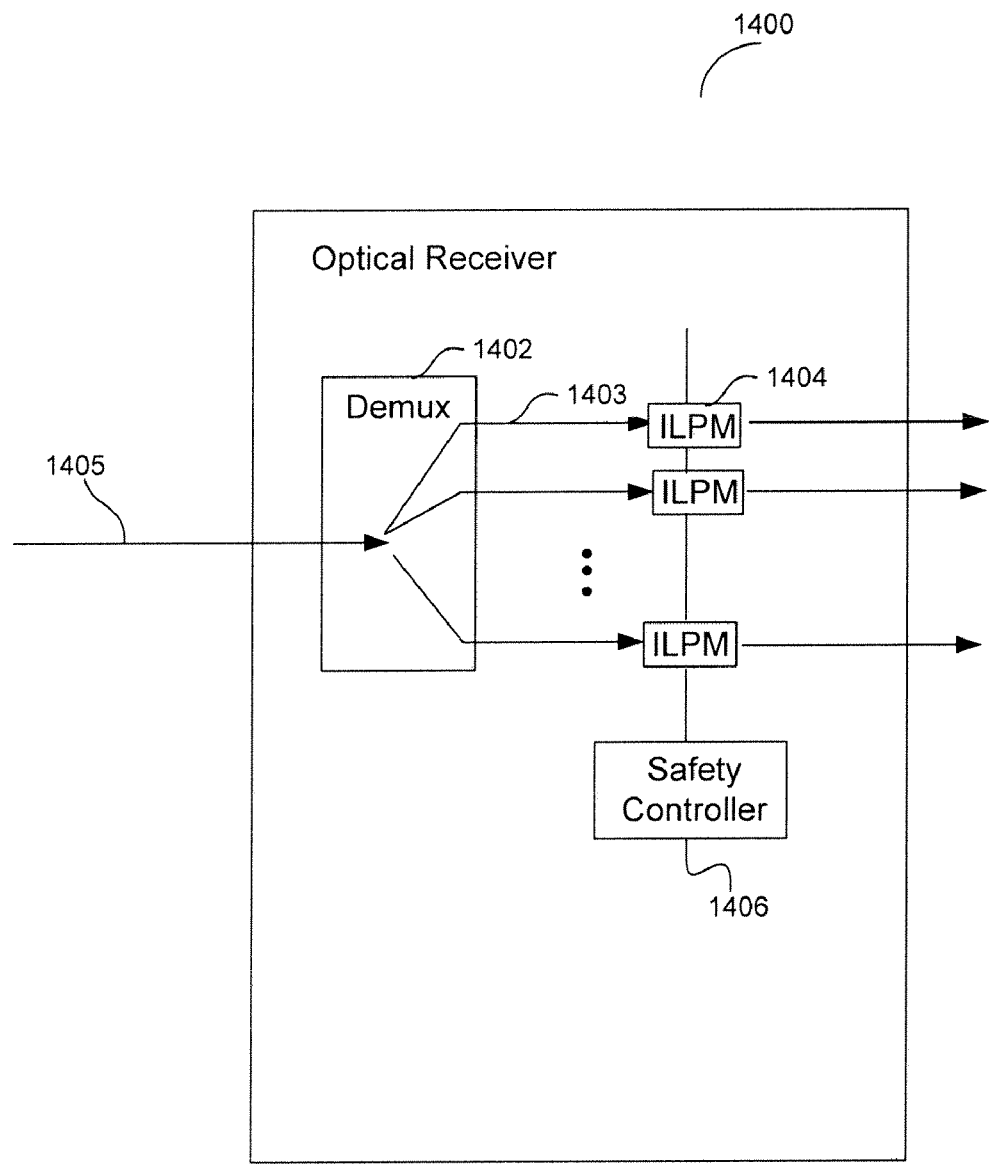
FIG. 14 is an example of optical receiver configured to demultiplex optical communications signal over temperature, according to an embodiment of the invention.

FIG. 14 is an example of an optical receiver configured to demultiplex optical communications signals over temperature, according to an embodiment of the invention. Optical receiver 1400 includes a demultiplexer configured to form optical signals 1403 each having a specific wavelength from a multiplexed optical signal 1405. Optical receiver 1400 also includes a number of in-line power monitors ("ILPM") 1404 disposed between a number of bias sources and number of APDs, both of which are not shown. In-line power monitors ("ILPM") 1404 are configured to monitor an input power over an extended range, and in some cases, adjust a bias voltage for one of the number of bias sources to set a gain of an APD to a predetermined value. Optical receiver 1400 includes a safety controller 1406 configured to cease generation of optical signals, either at optical receiver 1400 or at an optical transmitter (not shown) when a corresponding input power for one of the APDs violates an alarm limit. Generally, optical receiver 1400 and its number of in-line power monitors 1404 are contained in housing 1420.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments. For example, although the above descriptions of the various embodiments relate to APDs, the present invention can also apply to any other type of photodiode.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. An in-line monitoring apparatus to monitor input power of an optical signal received by an optical signal detector, said in-line monitoring apparatus comprising:
   an avalanche photodiode ("APD") configured to receive said optical signal;
   an input configured to provide a bias for said APD; and
   a power monitoring stage coupled to said input in parallel with said APD and further configured to generate a measurement signal in-situ, wherein said power monitoring stage provides an extended range over which said power monitoring stage measures said input power as an extended input power range, said power monitoring stage comprising two or more power monitoring stages to establish said extended input power range, each individual power monitoring stage of said two or mote power monitoring stages being configured to measure input power values within a separate portion of said extended input power range, where a first power monitoring stage is configured to detect a low-powered optical signal as said input power and a second power monitoring stage is configured to provide a linear range of input optical power levels,
   wherein said measurement signal is representative of said input power.

2. The in-line monitoring apparatus of claim 1 wherein said power monitoring stage being in parallel with said APD reduces a number of devices in a current measurement path that otherwise is in series with said APD.

3. The in-line monitoring apparatus of claim 2 wherein said measurement signal is generated during communication of data in a network without using a logarithmic amplifier.

4. The in-line monitoring apparatus of claim 1 wherein said power monitoring stage further comprises:
   a passive circuit clement coupled between said input and said APD; and
   a high-impedance amplifier coupled across said passive circuit element.

5. The in-line monitoring apparatus of claim 1 wherein said first power monitoring stage provides a first range portion comprising a non-linear portion including a range of measurable values of said low-powered optical signal and a linear range portion, and said second power monitoring stage provides another linear range portion.

6. The in-line monitoring apparatus of claim 1 wherein each of said individual power monitoring stages includes a current-sensing amplifier configured to generate said measurement signal in response to sensing a photocurrent for said APD, said current-sensing amplifier further comprising a resistance for filtering and for current-sensing, thereby foregoing separate resistances for individually filtering and current-sensing.

7. The in-line monitoring apparatus of claim 1 wherein said extended input power range comprises a first range portion in which to generate a first subset of values for said measurement signal to calibrate a gain for said APD and a second range portion in which to generate a second subset of values for said measurement signal to determine whether said input power is at a safety alarm level.

8. The in-line monitoring apparatus of claim 1 further comprising an in-line feedback controller.

9. The in-line monitoring apparatus of claim 8 wherein said in-line feedback controller further comprises a local data store for storing a bias offset to adjust said bias to a target bias for providing a target gain for said APD.

10. The in-line monitoring apparatus of claim 8 wherein said in-line feedback controller further comprises a local data store for storing a switch-over point, whereby said feedback controller is configured to select one power monitoring stage from said two or more power monitoring stages for receiving said measurement signal.

11. The in-line monitoring apparatus of claim 10 wherein said in-line feedback controller selects said one power monitoring stage as a function of a current.

12. The in-line monitoring apparatus of claim 8 further comprising an output to provide said measurement signal to an external gain calibrator for generating said bias offset.

13. The in-line monitoring apparatus of claim 8 wherein said in-line feedback controller further comprises an in-situ calibrator for calibrating said target gain.

14. The in-line monitoring apparatus of claim 8 wherein said in-line feedback controller further comprises a safety controller configured to generate an alarm signal indicating said optical signal exceeds a threshold above which said APD is susceptible to damage by said input power.

15. The in-line monitoring apparatus of claim 1 wherein said extended input power range includes at least about −3 dBm to about −45 dBm.

* * * * *